Patented Nov. 21, 1922.

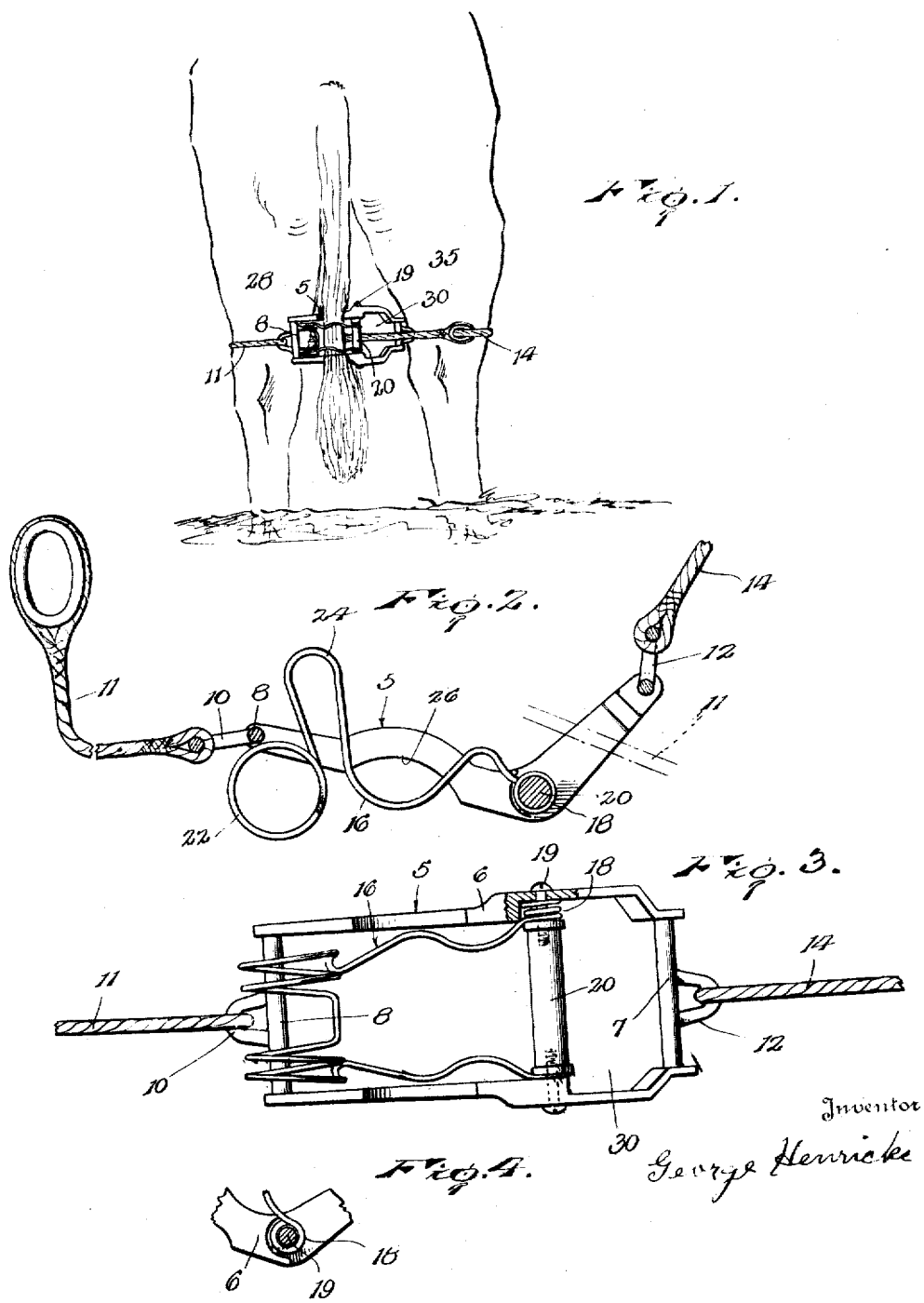

1,436,253

UNITED STATES PATENT OFFICE.

GEORGE HENRICKS, OF KREMMLING, COLORADO.

MILKING STRAP.

Application filed December 22, 1921. Serial No. 524,103.

*To all whom it may concern:*

Be it known that I, GEORGE HENRICKS, a citizen of the United States, residing at Kremmling, in the county of Grand and State of Colorado, have invented certain new and useful Improvements in a Milking Strap, of which the following is a specification.

This invention relates to animal restraining devices especially adapted for use when milking cows.

An important object of this invention is to provide a milking strap for cows having novel means to prevent the cow from switching her tail and from side stepping when being milked.

Further the invention aims to provide a milking strap having novel means whereby the cow is prevented from walking or kicking and possibly upsetting the receptacle receiving the milk.

Another object of the invention is to provide a milking strap of highly simplified construction, neat in appearance and cheap to manufacture.

Other objects and advantages of the invention will be apparent during the course of the following description.

In the accompanying drawings forming a part of this application and in which like numerals are employed to designate like parts throughout the same, Figure 1 is a side elevation of the improved milking strap applied.

Figure 2 is a horizontal sectional view through the same,

Figure 3 is a side elevation of the buckle or cow tail holder embodied in the invention, parts being shown in section.

Figure 4 is a detail view illustrating the means for urging the cow holding spring arm into position.

In the drawing wherein for the purpose of illustration is shown the preferred embodiment of the invention, the numeral 5 generally designates what might be termed a combined buckle and cow holding member, the said buckle and cow holding member consisting of spaced parallel arms 6 connected at their ends by cross rods 7 and 8. The cross rod 8 is as illustrated in Figure 3 provided intermediate its ends with an eyelet 10 with which a tying element 11 or leather strap is connected.

As illustrated in Figure 3 the intermediate portion of the cross rod 7 is also provided with an eyelet 12 with which a second tying element 14 is connected, the said tying elements 11 and 14 being adapted to be tied together so as to hold the legs of the animal in position and so as to hold the buckle in position.

A tail holding spring arm 16 is formed from a length of wire and has its sides provided with convolutions 18 passed about a pair of screw bolts 19 threaded through the sides 6 and into a sleeve or tubular member 20. The ends of the convolutions 18 are so connected to the buckle 5 that the spring arm is urged into engagement with the cross rod 8 at all times. As illustrated in Figure 2 the forward portions of the sides of the spring arm 16 are provided with finger receiving loops 22 by means of which the spring arm may be drawn outwardly when desired. Also the intermediate portion of the spring arm 16 is formed with bends 24 which are forced beyond the cross rod 8 in the manner illustrated in Figure 2. The spring arm 16 which is formed from a single length of metal is curved intermediate its ends and is adapted for cooperating with the side 6 in holding the tail of the cow securely in position. The intermediate portions of the arms 6 are curved longitudinally to form notches 26 for the reception of a portion of the cow's tail.

In applying the improved cow tail holder the flexible element 11 is passed about the left leg 28 of the cow and is then drawn rearwardly through a loop 30 formed by the side 6, cross rod 7 and the sleeve 20. The terminal portions of the side arms 6 are extended angularly as illustrated in Figure 2 so that the flexible elements 11 may be freely passed through the loop.

When the flexible element 11 has been passed through the loop 30 the flexible element 14 is passed between the right leg 35 and the left leg 28 and is then drawn rearwardly and engaged with the loop formed at the terminal portion of the member 11. The flexible elements 11 and 14 are now connected so as to hold the device securely in position whereby the animal is prevented from side stepping, walking or switching her tail.

Having thus described my invention what I claim is:—

1. A cow tail holder comprising a buckle inclusive of a pair of side members and rods connecting the side members, a spring actuated cow tail holder pivoted to said buckle and having a plurality of finger receiving loops forming a means whereby the spring arm may be drawn outwardly, the sides of said buckle being provided with notches adapted for the reception of a portion of the cow's tail, and flexible elements connected to said cross rods.

2. A device of the class described comprising a pair of spaced sides, cross rods connecting the ends of said sides and having eyelets, screw bolts extended through said sides intermediate the ends of the same, a sleeve receiving the ends of said screw bolts and cooperating with said sides and the adjacent cross rods for forming a loop, a spring arm formed from a single length of metal having its terminal portions formed with convolutions receiving portions of said screw bolts, the terminal portion of said spring arm being provided with finger receiving loops and with bends defining tail engaging portions, the portions of said sides between said sleeve and one of said rods being extended angularly, whereby said loop is disposed angularly, and flexible elements connected to said eyelets.

In testimony whereof, I have affixed my signature in the presence of two witnesses.

GEORGE HENRICKS.

Witnesses:
GEORGE THOMAS,
J. H. HARRIS.